United States Patent
Zhu et al.

(10) Patent No.: US 10,019,594 B2
(45) Date of Patent: *Jul. 10, 2018

(54) PATTERN FOR SECURE STORE

(71) Applicant: Honeywell International, Inc., Morris Plains, NJ (US)

(72) Inventors: Qi Zhu, Suzhou (CN); Jian Yin, Suzhou (CN); Fei Jing, Suzhou (CN)

(73) Assignee: Honeywell International, Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,826

(22) Filed: May 22, 2017

(65) Prior Publication Data

US 2017/0329988 A1    Nov. 16, 2017

Related U.S. Application Data

(63) Continuation of application No. 14/405,278, filed as application No. PCT/CN2012/077067 on Jun. 18, 2012, now Pat. No. 9,659,183.

(51) Int. Cl.
*H04L 9/00* (2006.01)
*G06F 21/62* (2013.01)
*G06F 21/60* (2013.01)

(52) U.S. Cl.
CPC ........ *G06F 21/6218* (2013.01); *G06F 21/602* (2013.01); *G06F 21/62* (2013.01)

(58) Field of Classification Search
None
See application file for complete search history.

(56) References Cited

U.S. PATENT DOCUMENTS

| | | |
|---|---|---|
| 8,336,107 B2 | 12/2012 | Smith |
| 8,856,821 B2 | 10/2014 | Lu et al. |
| 9,659,183 B2 | 5/2017 | Zhu et al. |
| 2004/0078568 A1 | 4/2004 | Pham |
| 2008/0086729 A1 | 4/2008 | Kondoh |
| 2008/0155276 A1 | 6/2008 | Chen et al. |
| 2013/0080773 A1 | 3/2013 | Lu et al. |

FOREIGN PATENT DOCUMENTS

| | | |
|---|---|---|
| CN | 101763225 A | 6/2010 |
| CN | 101853363 A | 10/2010 |
| WO | 2013189008 A1 | 12/2013 |

OTHER PUBLICATIONS

Internation Search Report for Parent Application WO2013/189008 (PCT/CN2012/077067), dated Mar. 28, 2013, 2 pages Previously submitted in parent.

*Primary Examiner* — Brandon S Hoffman
(74) *Attorney, Agent, or Firm* — Additon, Higgins & Pendleton, P.A.

(57) ABSTRACT

A computer system, computer product, and method for accessing a secure store, which includes receiving a request to access a secure store, checking the file path of the request to make sure it exists in the secure store, verifying security parameters from the process at the file system filter layer, saving the PID of the process by the file system filter layer, comparing the saved PID to the process's PID, and allowing the process to access the path in the secure store specified in the request.

20 Claims, 4 Drawing Sheets

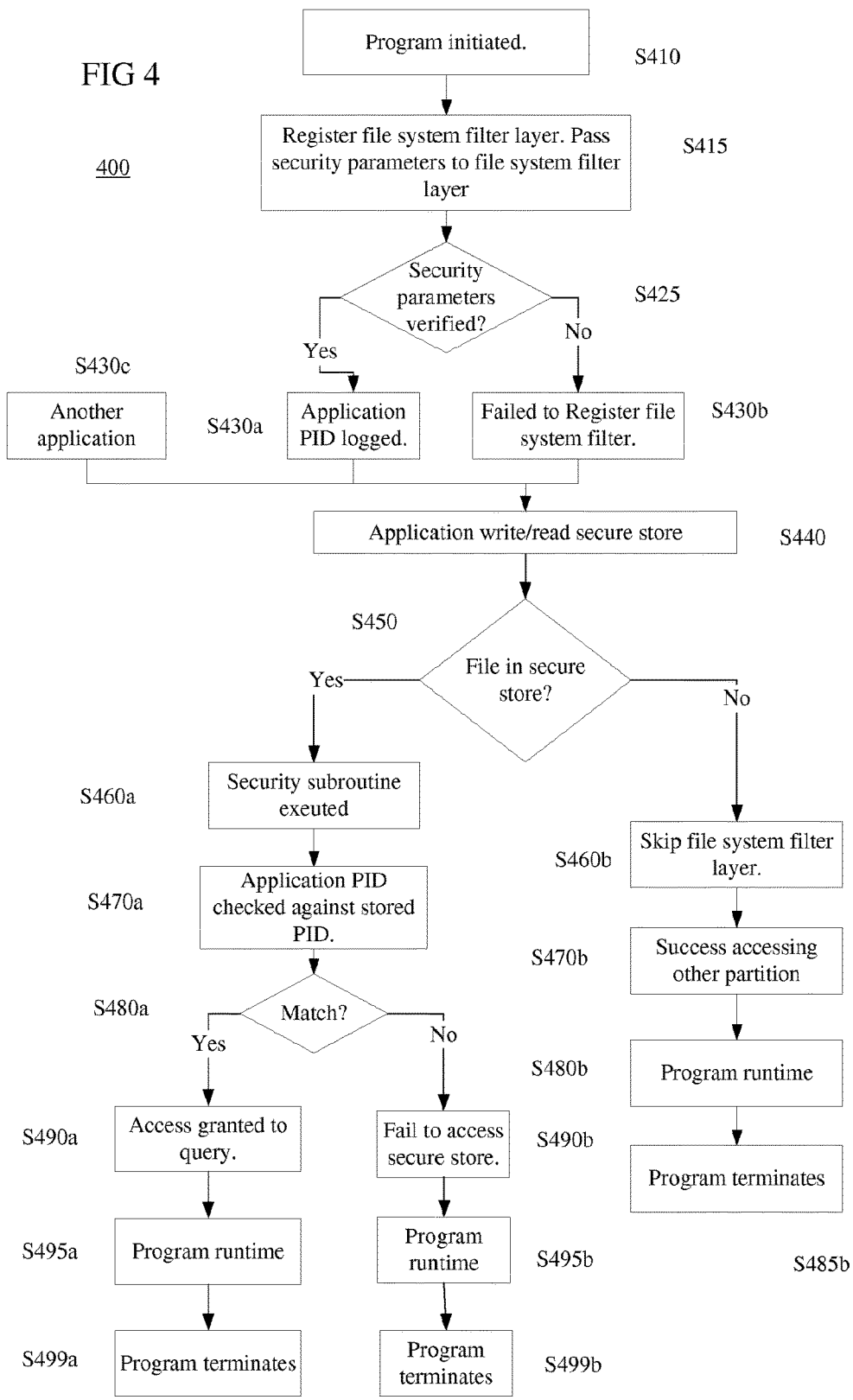

PATTERN FOR SECURE STORE

FIELD OF INVENTION

The present invention provides a secure system and method for determining whether an item is warranty-eligible.

BACKGROUND OF INVENTION

Companies, including manufacturers and vendors of products, warranty their products, including but not limited to hardware and software components. The warranties for products are often handled by an "after-sales" department, such as customer support. When a product requires replacement or maintenance, the validity of the warranty determines whether the expense is covered by the guarantor of the warranty. To determine whether a product is under warranty, it is not enough to track only the warranty period, for example, by correlating the warranty number to its validity period. However, many products, including but not limited to, hardware components, have maximum usage numbers that contribute to whether an item is covered under a warranty. If the maximum usage has been exceeded, a unit may not be covered.

Although a warranty number is public, the maximum usage number is often confidential so that a user cannot access it and manipulate it.

A need therefore exists for a system and method of storing confidential warranty-related information, including but not limited to, the maximum usage number for a given component.

SUMMARY OF INVENTION

An object of the present invention is to provide a secure system and method for determining whether an item is warranty-eligible.

In an embodiment of the present information, warranty information, including but not limited to the maximum usage number and the warranty number and term, is protected in a secure store. This security store is queried by an application executed on a processor, which satisfies the security credentials of the server housing the security store.

In an embodiment of the present invention, the security credentials are not known to the user of an application that checks confidential data in the secure store. Disseminating security credentials beyond authorized personnel represents a security risk. Further, the security credentials are not entered by the user, even an authorized user, and in an embodiment of the present invention, embedded in the application itself that accesses the secure store.

In a further embodiment of the present invention, the license key is embedded in the device manufacture data. The application accesses the license key from the manufacture data via a private interface. The license key is then encrypted to security parameters by a mathematical algorithm familiar to one of skill in the art, including but not limited to SHA, MDS, and/or CRC. When the encrypted security parameters are passed to the file system layer, they are decrypted to the license key using the same algorithm(s). Thus, in this embodiment, at both the license key and the mathematical algorithm are needed in order to access to pass through this level of verification to the secure store.

Additionally, in an embodiment of the present invention, the ability for a user to unmount or format the secure partition where the secure store is housed, is disabled from the user perspective. Disabling this functionality enhances security because the uninterrupted and unchanged connection to the secure partition enables the processor on the client making this connection to log all activity because this partition will be continuously "watched" by the system.

In an embodiment of the present invention, because the secure partition cannot be unmounted or formatted by a user, for the purposes of in-house maintenance, the partition can be formatted through a developer's bootload. Thus, for example, if the secure partition becomes corrupted and must be formatted to restore the integrity of the data, a developer can modify the partition can modify the partition via the bootloader when the operating system is launched.

In an embodiment of the present invention, the secure store is accessed by an application that is verified both by the security parameters that it passes the file system filter, and by the PID assigned to the application (program). In an embodiment of the present invention, this application encrypts the license key embedded in the device manufacture data and this encrypted value comprises the security parameters that are passed to the file system filter. At this level, the security parameters are decrypted to access the license key, which is verified by the file system filter.

In an embodiment of the present invention, the application, the program, that accesses the security store is comprised of computer-readable code and is executed on a processor on a client. The computer code is stored on one or more memory resources that are/is accessible to the client processor. The location of the resource(s) can be internal and/or external to the client.

In an embodiment of the present invention, before accessing the stored data in the secure store, the application, i.e., the program, initiates a security process. First, the security parameters passed by the program are verified by a file system filter layer on the secure partition. If the parameters pass the verification by the file system filter layer on this file system level, the file system filter layer saves the application's process identification (PID).

In an embodiment of the present invention, when the application, the originating program, after completion of the security sub-program, requests access to confidential information, including the warranty information in the secure store, the file system filter layer first checks that the PID has been saved. The application can continue if and only if the PID is saved. Otherwise, the information request is rejected. This originating program cannot run without a PID.

In an embodiment of the present invention, once the originating program accesses the security store, the program terminates. If the application seeks to access the security store at another point, the security sub-process (verification of the security parameters in the program and logging of the program's PID and additional security check for the logged PID, must complete before the originating program can access the security store.

BRIEF DESCRIPTION OF DRAWINGS

FIG. 4 depicts a workflow of an embodiment of the present invention.

DETAILED DESCRIPTION OF THE INVENTION

The present invention provides a secure system and method for determining whether an item is warranty-eligible.

The present invention offers a tiered security approach to protecting information, including but not limited to, information regarding whether a warranty for a product is still valid, such as the usage information and warranty number and term. An application utilizing a traditional application programming interface (API) to access the secure store housing this information could present a security risk. A traditional API passes security parameters to access secure information and these parameters are entered by a user. Giving security parameters to a user adds a level of exposure to the secure store. Thus, as discussed later, in an embodiment of the present invention, the security parameters are embedded in an application. In an embodiment of the present invention, this security measure is not the only security measure the program passes to gain access to the secure store.

In an embodiment of the present invention, the interactions of the user with the system are further limited by disabling the ability of the user to format or dismount the secure partition that houses the security store. In fact, the partition cannot be dismounted or formatted from the application level. Limiting this access has at least two advantages: 1) the data in the secure store is further protected; and 2) the computer system upon which the secure store is mounted can accurately monitor and log the activity in the secure store. When a partition is unmounted, the client that later mounts the partition is unaware of the activities within the partition during the time that the partition was unmounted. This knowledge gap compromises the security of the system in cases where the secure partition is hacked when it is unmounted and the data and/or its integrity is compromised.

In an embodiment of the present invention, because the secure partition cannot be unmounted or formatted by a user, for the purposes of in-house maintenance, the partition can be formatted through a developer's bootload. Thus, for example, if the secure partition becomes corrupted and must be formatted to restore the integrity of the data, a developer can modify the partition can modify the partition via the bootloader when the operating system is launched.

Figure 1:
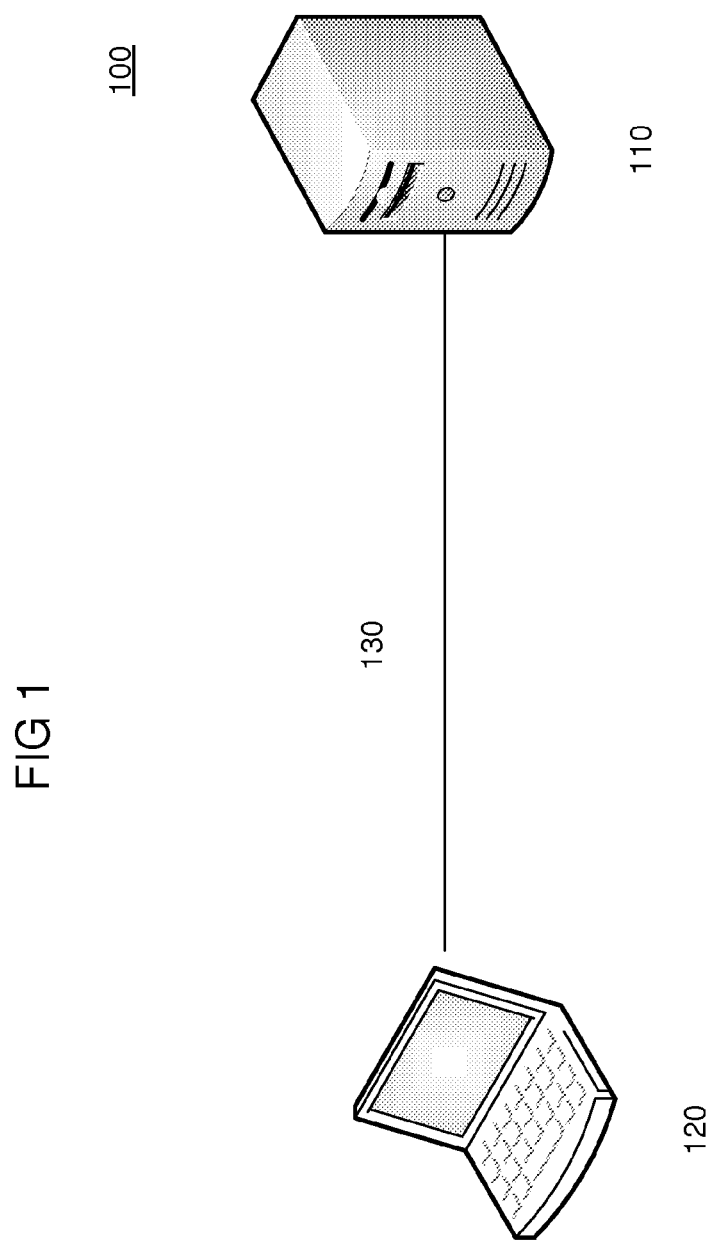
FIG. 1 depicts a technical architecture of an embodiment the present invention.

FIG. 1 depicts a technical architecture of an embodiment of the present invention. In this embodiment 100, the secure partition where the secure store is location is represented by a server 110. However, the secure partition is not limited to a single machine and can also be a partition of the same computer that executed the program that queries the secure store.

A client 120 executes a program to connect to the secure partition on server 110. In FIG. 1, the network connection 130 between the server 110 and the client 120 is accomplished via a LAN. However, the client 120 can connect to the server 110 using any connection known to one of skill in the art, including but not limited to, a WAN, a VPN, a private frame relay, and/or the Internet.

Figure 2:
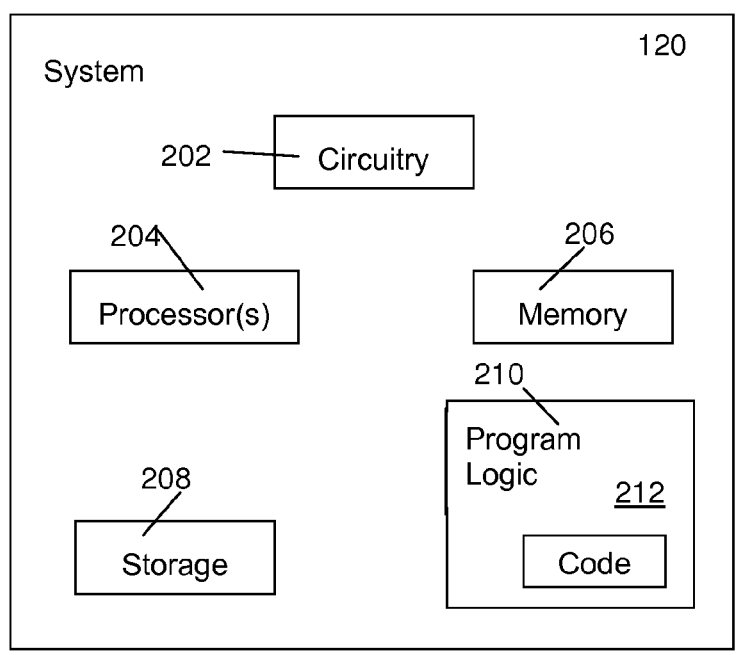
FIG. 2 depicts an aspect of an embodiment the present invention.

FIG. 2 illustrates a block diagram of a client, a computer system 120, which is part of the technical architecture of certain embodiments of the present invention. (An embodiment of the server 110, also a computer system, is illustrated in FIG. 2.) The system 120 may include a circuitry 202 that may in certain embodiments include a microprocessor 204. The computer system 200 may also include a memory 206 (e.g., a volatile memory device), and storage 208. The storage 208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 208 may comprise an internal storage device, an attached storage device and/or a network accessible storage device. The system 200 may include a program logic 210 including code 212 that may be loaded into the memory 206 and executed by the microprocessor 204 or circuitry 202.

In certain embodiments, the program logic 210 including code 212 may be stored in the storage 208. In certain other embodiments, the program logic 210 may be implemented in the circuitry 202. Therefore, while FIG. 2 shows the program logic 210 separately from the other elements, the program logic 210 may be implemented in the memory 206 and/or the circuitry 202.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 3:
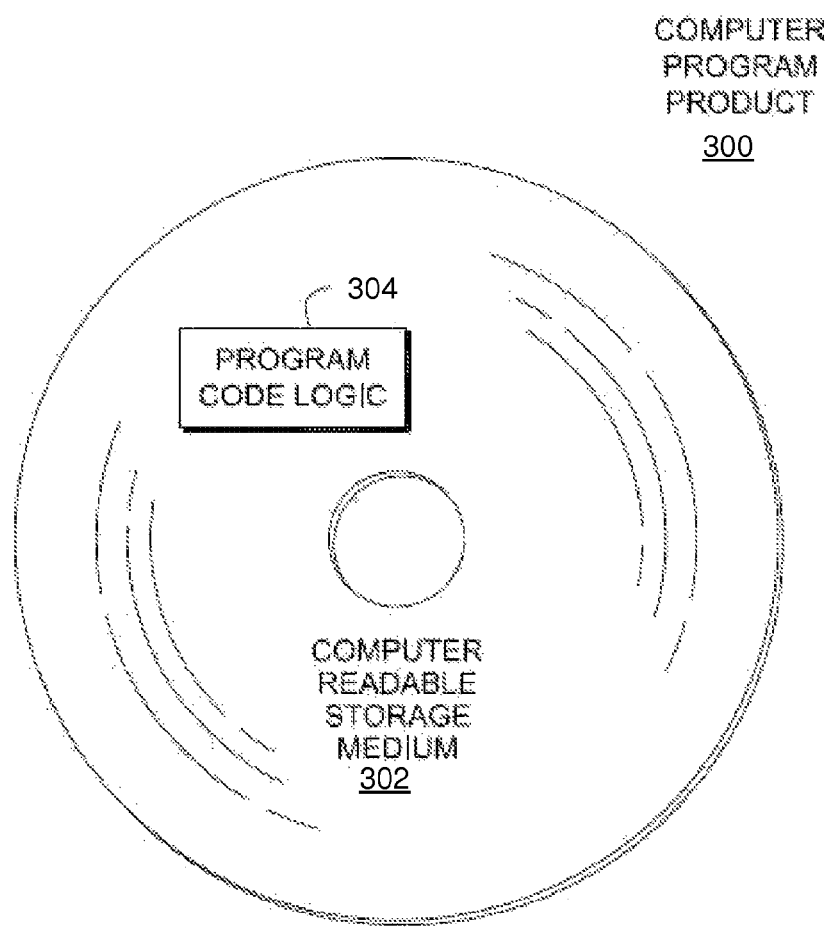
FIG. 3 depicts an aspect of an embodiment the present invention.

Using the processing resources of a client 120 to execute software, computer-readable code or instructions, does not limit where this code is can be stored. Referring to FIG. 3, in one example, a computer program product 300 includes, for instance, one or more non-transitory computer readable storage media 302 to store computer readable program code means or logic 304 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages.

The program code may execute entirely on one resource, such as the server 110, the client 120, or partly on various resources.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Although the architectures depicted in FIGS. 1-2 are non-limiting examples, for ease of understanding only, these figures are referenced throughout FIG. 4, a workflow 400 of an embodiment of the present invention.

To initiate the query process, the client 120 executes a program (application). The program is initiated (S410) and executes on a client 120 processor and is comprised of computer-readable code. The computer code is stored on one or more memory resources that are/is accessible to the client 120 processor. The location of the resource(s) can be internal and/or external to the client 120.

First, the program registers on the file system layer and the security parameters are passed to the file system filter layer (S415). Once the security parameters are passed to the file system filter layer attempts to verify the passed security parameters (S420).

If these parameters are verified by the file system filter layer, the PID of the program is saved (S430a) on a memory resource in the physical machine where the file system filter layer resides and/or on a memory resource that is accessible to the file system filter layer via a communications connection. If the security parameters are incorrect or absent, the application fails to register at the file system filter layer (S430b).

An application may attempt to bypass the security at the file system filter layer and directly access the security store. Such an application is seen in FIG. 4 (S430c). This application did not register at the file system filter layer (S415) and did not pass security parameters that were verified (S415). This application is included in FIG. 4 to demonstrate the operation of the security features of the embodiment when an application fails to clear the security at the file system filter level before attempting to access the secure store.

The registration of the application to the file system filter layer may be handled as part of the security routine or as part of a subroutine. One of skill in the art will recognize that the use of a sub-routine to accomplish tasks that feed into the master routine is just a programming preference. Further embodiments of the present invention incorporate the security check by the file system filter layer into a single programming routine, and/or use a separate routine. FIG. 4 is shows some steps as a part of the same routine that can be separated into sub-routines in further embodiments just for the sake of clarifying the different security measures involved in accessing the secure store. Additionally, the check for a logged PID, which is discussed later, is represented as a subroutine in this embodiment. However, one of skill is the art will recognize that this is one of many potential programming choices in structuring this workflow.

In an embodiment of the present invention, the security parameters are an encrypted license key. This license key is embedded in the device manufacture data, for example, for a hardware component. The program accesses the embedded data to retrieve the license key via a secure connection, including but not limited to, a private interface created by the executed computer code, the application. After the license key is retrieved, it is encrypted by a mathematical algorithm. Various mathematical encryption algorithms are known to one of skill in the art and can be employed by this process. Encryption algorithms that can be used to encrypt the license key include but are not limited to SHA, MDS, and/or CDC.

When the security parameters comprise an encrypted license key, the file system filter layer decrypts the security parameters to verify the license key. For decryption, the same algorithm that was used in encryption is employed. In this embodiment, only a program with both the correct encryption algorithm and the license can gain access to the secure store.

Returning to FIG. 4, after logging the PID (S430a), the program attempts to access (read/write) a file in the secure store (S440). The application that failed to register (S430b), and the application that bypassed registration (S430c) also attempts to access a file in the secure store (S440). First, the path of the file is checked to see if the file is in the secure store (S450). If the path is to the secure store, a security subroutine is executed (S460a) to check the PID of the application against the PID stored by the file system filter layer (S470a). The subroutine checks whether the PID of the application matches the stored PID (S480a). If the PIDs match, the query, for example, to retrieve warranty information, is given access to the secure store (S490a) and the program runtime executes (S495a). After the runtime is complete, the program terminates (S499b). Once the secure store's warranty information is retrieved by an application that passes the security, in order to complete a new query, the same security routine 400 repeats. Each instance of the application will have a different PID so for a match to occur, the PID of the new instance is logged at the file system filter layer.

If the PID of the application does not match the saved PID, which is the case both with the application that bypassed the security at the file system filter layer (S430c) and the application where the security parameters were not verified (S430b), the application fails to access the secure store (S490b). The program runs (S495b) and terminates without having accessed the secure store (S499b).

If the file that the application is attempting to access is not in the secure store, but located in a different partition, the file system layer check is bypassed (S460b). The application accesses another, non-secure partition (S470b), where the application runtime completes (S480b) and the program terminates (S485b).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiment with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

Although the present invention has been described in relation to securing warranty information, one of skill in the art will recognize that the security measures disclosed are applicable to protect access to sensitive information across different applications and industries. The use of the system and method is described relative to protecting warranty information but is not limited to this application.

The invention claimed is:

1. A system comprising:
   at least one processor;
   at least one memory;
   at least one tangible storage device;
   a secure partition, the secure partition comprising a secure store and a file system filter layer, the file system filter layer comprising a file system filter layer memory; and
   instructions stored on the at least one storage device for execution by the at least one processor via the at least one memory to execute:
      a first process comprising instructions for accessing the secure store, wherein the first process comprises a request including a file path to the secure store for accessing the secure store; and
      a second process comprising instructions for:
         assigning a process identifier ("PID") to the first process in response to an execution of the first process;
         verifying the file path exists in the secure store;
         causing the first process to register into the file system filter layer based on the verification;
         causing the first process to pass security parameters to the file system filter layer;
         verifying the security parameters at the file system filter layer;
         saving a record of the PID in the file system filter layer memory, in response to verifying the security parameters;
         causing the first process to query the secure store;
         matching the PID to the saved record of the PID in response to the first process querying the secure store; and
         allowing, upon matching the PID, the first process to access the file path in the secure store.

2. The system of claim 1, wherein the secure partition cannot be unmounted from a front end application executable on the system.

3. The system of claim 1, wherein the secure partition cannot be modified from a front end application.

4. The system of claim 1, wherein the second process comprises instructions to cause the first process to fail to register into the file system based on an incorrect verification.

5. The system of claim 1, wherein the second process comprises instructions to restrict the first process from accessing the secure store based on an incorrect verification.

6. The system of claim 1, wherein the second process comprises instructions to restrict the first process from accessing the secure store when the PID of the first process is not matched to the saved record of the PID.

7. The system of claim 1, wherein the security parameters comprise a license key of a product, and wherein the system comprises instructions for executing:
   the first process to retrieve the license key from the product;
   the first process to encrypt the license key with a mathematical encryption algorithm; and
   at the file system filter layer, decryption of the license key based on the mathematical encryption algorithm.

8. The computer system of claim 7, wherein the mathematical encryption algorithm is one of: SHA, MD5, CRC.

9. A method, comprising:
   receiving a request to access data in a secure store of a computing system, from a first process, the request including a file path to the data in the secure store, wherein the first process is associated to a process identifier (PID); and
   executing, in response to receiving the request, a second process for:
      verifying that the file path exists in the secure store;
      validating security parameters received from the first process at a file system filter layer of the computing system;
      creating a saved PID in a memory resource upon validating the security parameters, wherein the PID is saved by the file system filter layer and the memory resource is accessible to the file system filter layer;
      matching the saved PID to the PID associated with the first process; and
      granting, upon matching, access to the first process for the data at the file path in the secure store.

10. The method of claim 9, wherein the data in the secure store is indicative of warranty information regarding a plurality of products, and wherein the request is to ascertain whether one of the plurality of products is under warranty.

11. The method of claim 10, wherein the warranty information comprises at least one of a maximum usage number of the products, a warranty number, and a term of warranty.

12. The method of claim 9, comprising decrypting the security parameters by utilizing a mathematical encryption algorithm.

13. The method of claim 12, wherein the decrypted security parameters comprise a license key for one of plurality of products.

14. The method of claim 9, comprising bypassing the validation of the security parameters if the file path is not verified to exist in the secure store.

15. A system comprising:
   at least one processor;
   at least one memory;
   program instructions executable by the at least one processor wherein the program instructions execute:
      a first process comprising a request to access a secure store of the system; and
      a second process to:
         assign a process identifier (PID) to the first process in response to the first process being executed by the at least one processor;
         register the first process into the file system filter layer;
         verify security parameters accessed from the first process at the file system filter layer; and
         allow the first process to access the secure store based on a validation of the PID, wherein the validation includes matching the PID to a registered PID at the file system filter layer.

16. The system of claim 15, wherein the secure store comprises warranty information indicating whether a product is under warranty and wherein the warranty information comprises at least one of a warranty number, a maximum usage number, and a warranty term associated with the product.

17. The system of claim 15, wherein the security parameters comprise an encrypted license key of a product.

18. The system of claim 15, wherein the request to access the secure store comprises a file path corresponding to a file.

19. The system of claim 18, wherein the second process is to verify existance of the file path in the secure store.

20. The system of claim 19, wherein the second process is to:

perform a security check, the security check comprising validation of the security parameters passed by the first process at the file system layer, if the file path is verified to exist in the secure store, bypass the security check, if the file path is not verified to exist in the secure store.

\* \* \* \* \*